US011990296B2

(12) United States Patent
Schmidt et al.

(10) Patent No.: US 11,990,296 B2
(45) Date of Patent: May 21, 2024

(54) SHORT-CIRCUITING DEVICE, CONVERTER AND SHORT-CIRCUITING METHOD

(71) Applicant: Innomotics GmbH, Nuremberg (DE)

(72) Inventors: Werner Schmidt, Chemnitz (DE); Jürgen Einschenk, Panketal (DE); Frank Schremmer, Fürth (DE)

(73) Assignee: Innomotics GmbH, Nuremberg (DE)

( * ) Notice: Subject to any disclaimer, the term of this patent is extended or adjusted under 35 U.S.C. 154(b) by 508 days.

(21) Appl. No.: 17/279,010

(22) PCT Filed: Sep. 3, 2019

(86) PCT No.: PCT/EP2019/073379

§ 371 (c)(1),
(2) Date: Mar. 23, 2021

(87) PCT Pub. No.: WO2020/064271

PCT Pub. Date: Apr. 2, 2020

(65) Prior Publication Data

US 2022/0037096 A1 Feb. 3, 2022

(30) Foreign Application Priority Data

Sep. 24, 2018 (DE) ..................... 10 2018 216 211.5

(51) Int. Cl.
*H01H 3/26* (2006.01)

(52) U.S. Cl.
CPC .................................... *H01H 3/26* (2013.01)

(58) Field of Classification Search
CPC .......... H01H 3/26; H01H 3/28; H01H 3/3031; H01H 1/52; H01H 1/54; H01H 45/00; H01H 79/00; H01H 33/38; H01H 39/004; H01H 33/6664
USPC .......... 200/329, 552, 43.11, 43.16, 421, 470, 200/522
See application file for complete search history.

(56) References Cited

U.S. PATENT DOCUMENTS 3,253,098 A * 5/1966 Perry .................. H01H 33/666 335/170
3,532,843 A 10/1970 Pucher
3,562,682 A * 2/1971 Ohwada .............. H01H 33/668 335/201

(Continued)

FOREIGN PATENT DOCUMENTS

CH 502 688 A 1/1971
CN 1309812 A 8/2001

(Continued)

OTHER PUBLICATIONS

PCT International Search Report and Written Opinion of International Searching Authority dated Sep. 12, 2019 corresponding to PCT International Application No. PCT/EP2019/073379 filed Mar. 9, 2019.

*Primary Examiner* — William A Bolton
(74) *Attorney, Agent, or Firm* — Henry M. Feiereisen LLC

(57) ABSTRACT

An electrical short-circuiting device includes a fixed contact piece and a movable contact piece. The fixed and movable contact pieces are distanced from one another in a basic position and electrically conductively connected to one another in a short-circuit position. A drive transfers the movable contact piece from the basic position into the short-circuit position, and a trigger device includes an electrically driven actuator for triggering the drive.

17 Claims, 4 Drawing Sheets

(56) References Cited

U.S. PATENT DOCUMENTS

| | | | | |
|---|---|---|---|---|
| 5,912,604 | A * | 6/1999 | Harvey | H01H 33/6662 218/138 |
| 6,262,648 | B1 | 7/2001 | Lammers | |
| 6,657,150 | B1 | 12/2003 | Shea et al. | |
| 8,836,455 | B2 * | 9/2014 | Gu | H01H 36/00 335/179 |
| 9,293,243 | B2 * | 3/2016 | Kim | H01F 7/1615 |
| 9,508,514 | B2 * | 11/2016 | Ohda | H01F 7/122 |
| 9,842,717 | B2 * | 12/2017 | Jeong | H01H 71/04 |
| 9,870,888 | B2 * | 1/2018 | Hahn | H01H 50/645 |
| 2009/0120773 | A1 | 5/2009 | Gentsch et al. | |
| 2010/0118453 | A1 | 5/2010 | Dorn et al. | |
| 2010/0219162 | A1 | 9/2010 | Gentsch | |
| 2015/0109079 | A1 | 4/2015 | To | |
| 2015/0380145 | A1 | 12/2015 | Koch et al. | |
| 2016/0268082 | A1 | 9/2016 | Bachmaier et al. | |
| 2017/0062156 | A1 | 3/2017 | Kralik | |
| 2017/0345585 | A1 | 11/2017 | Lang | |
| 2018/0144890 | A1 * | 5/2018 | Boettcher | H01H 3/30 |

FOREIGN PATENT DOCUMENTS

| | | | |
|---|---|---|---|
| CN | 101454859 | A | 6/2009 |
| CN | 101796604 | A | 8/2010 |
| CN | 105244204 | A | 1/2016 |
| CN | 105706204 | A | 6/2016 |
| CN | 106537539 | A | 3/2017 |
| CN | 107408478 | A | 11/2017 |
| DE | 10 94 864 | B | 12/1960 |
| DE | 23 56 516 | A1 | 5/1975 |
| DE | 198 08 083 | C1 | 4/1999 |
| DE | 10 2007 018 344 | A1 | 10/2008 |
| DE | 10 2011 088 745 | A1 | 6/2013 |
| DE | 10 2015 203 645 | A1 | 9/2016 |
| EP | 2605257 | A1 | 6/2013 |
| EP | 3085158 | A1 | 9/2016 |
| RU | 2635098 | C1 | 11/2017 |
| SU | 1467588 | A1 | 3/1989 |
| WO | WO 2018041874 | A1 | 3/2018 |

* cited by examiner

SHORT-CIRCUITING DEVICE, CONVERTER AND SHORT-CIRCUITING METHOD

CROSS-REFERENCES TO RELATED APPLICATIONS

This application is the U.S. National Stage of international Application No, PCT/EP2019/073370, filed Sep. 3, 2019, which designated the United States and has been published as international Publication No, WO 2020/064271 A1 and which claims the priority of German Patent Application, Serial No. 10 2018 216 0.211,5, filed Sep. 24, 2018, pursuant to 35 U.S.C. 119(a)-(d).

BACKGROUND OF THE INVENTION

The invention relates to an electrical short-circuiting device having a fixed and a movable contact piece, the contact pieces being distanced from one another in a basic position and being electrically conductively connected to one another in a short-circuit position, having a drive for transferring the movable contact piece from the basic position into the short-circuit position and having a trigger device for triggering the drive.

The invention further relates to a converter, in particular a multilevel converter, which has at least one electrical short-circuiting device of this kind.

The invention furthermore relates to a corresponding method for short-circuiting contact pieces.

Multilevel converters consisting of power modules connected in series are used in particular for high-voltage direct current transmission in the context of power distribution and transmission. If a power module fails due to an error, it has to be bridged as quickly as possible, as otherwise the entire system can fail. The power module is bridged by means of a short-circuiting device.

Short-circuiting devices are known in the prior art. The document DE 1 094 864 B describes a short-circuiting device with a plurality of fixed contact pieces arranged symmetrically or in a star shape and a movable contact piece connected to an energy store for bridging arcing in electrical medium-voltage or high-voltage systems. To trigger the short-circuiting device, a blow is provided on a pin which is coupled to an armature of a holding magnet, the armature being under the action of a breakaway spring. The short-circuiting device is triggered when the holding magnet is de-energized.

A short-circuiting device with a similar trigger device is also described in DE 10 2007 018 344 A1. The trigger device comprises a permanent magnet, a soft-magnetic yoke connected to the permanent magnet, an armature connected to a moving contact bolt under tension and an electrical coil. Expedient energization of the electrical coil results in the force of the permanent magnet being weakened so that the armature is torn off the soft-magnetic yoke or the permanent magnet.

The challenge with such triggering devices is that they may be susceptible to stray magnetic fields which can lead to unwanted triggering.

With a view to bridging as quickly as possible, it is usual to use pyrotechnically operated short-circuiting devices such as those disclosed, for example in the DE 10 2015 203 645 A1.

In pyrotechnically operated short-circuiting devices, due to the pyrotechnic drive, the challenge is that theft use requires account to be taken of different national import regulations, explosive laws and further regulatory specifications.

It is the object of the invention to disclose an electrical short-circuiting device, a converter and a method which allow short-circuiting that is as quick and safe as possible. In particular, a pyrotechnic drive should be dispensed with in the short-circuiting device and in addition the trigger device of the short-circuiting device should be able to function without a permanent magnet.

SUMMARY OF THE INVENTION

The object is achieved by the features of the independent claims. Advantageous embodiments are disclosed in the subclaims.

According to the invention, an electrical short-circuiting device is provided with a fixed and a movable contact piece, the contact pieces being distanced from one another in a basic position and being electrically conductively connected to one another in a short-circuit position, having a drive for transferring the movable contact piece from the basic position into the short-circuit position and having a trigger device for triggering the drive. It is provided that the trigger device comprises an electrically driven actuator for the triggering.

Therefore, it is provided with the electrical short-circuiting device according to the invention that the actuator of the trigger device is electrically driven. This means that an electrical drive is used for the generation of the mechanical movement of the actuator. Such an actuator has very fast triggering times. Since no permanent magnet is used in the trigger unit, the short-circuiting device is also not susceptible to stray magnetic fields thus enabling reliable triggering. The electrical short-circuiting device according to the invention can achieve closing times t of $t<2$ ms.

An electrical short-circuiting device constructed in this way is in particular suitable for use in electrical medium-voltage and high-voltage systems, for example in a converter.

According to a preferred embodiment of the invention, it is provided that the actuator comprises a fixed stator and a rotor that can be moved linearly along an axis of motion, the stator comprising a first coil and the rotor comprising a second coil for interaction with the first coil, the stator and the rotor being arranged along the axis of motion, the two coils being aligned parallel to one another and both coils being air-core coils that can be actively energized at least in respect of their interaction. To ensure that the electrical short-circuiting device has short closing times, it is obviously advantageous for the trigger device to be particularly fast. The actuator described is particularly suitable for this. The two coils can be energized in such a way that they repel one another. The energization leads to a magnetic field in each of the cons. The alternating Lorentz force generated by the interaction between the coil magnetic field in one coil and the current in the other coil causes the cons to repel one another. Since they are air-core cons, they do not have a soft-magnetic core and have relatively small inductances compared to coils with a soft-magnetic core. The force of such an actuator is also effective if the current in the coil only changes slowly and is hence active over the entire period in which the cons are energized. Dispensing with the soft-magnetic material causes the inductance of the actuator to decrease as a result of which the current rise in the actuator can take place more quickly. A rapid current rise leads to a rapid increase in force. Hence, the actuator is particularly suitable for enabling the short-circuiting device to be triggered quickly.

According to a further preferred embodiment of the invention, the trigger device comprises a locking mechanism for locking the drive, the drive for releasing the locking mechanism being triggerable by means of the electrically driven actuator. The use of such a trigger device enables a particularly rapid transfer of the movable contact piece.

The actuator preferably comprises a plunger for releasing the locking mechanism. i.e., this plunger releases the locking mechanism (latching) when triggered. Herein, the plunger transmits the force of the actuator and releases the locking mechanism of the short-circuiting device. The movement of the plunger is preferably guided so that the movement of the plunger is controlled. The locking mechanism preferably has a locking pawl. This locking pawl is the actual locking element of the locking mechanism. Herein the plunger particularly preferably acts directly on the locking pawl of the locking mechanism.

An energy store is provided to deliver the energy that the drive requires to transfer the movable contact piece from the basic position into the short-circuit position.

In principle, any type of energy store is suitable for this, such as, for example, a chemical or an electrical energy store.

In particular, it is provided that the drive comprises a mechanical energy store for its energy supply. A mechanical energy store, such as, for example, a spring arrangement with at least one spring, in particular a disk spring, has the advantage that no pyrotechnic substances are used which simplifies approval and increases safety. In addition, mechanical energy stores are long-lasting and robust. Unlike pyrotechnic means, they are relatively easy to resupply with energy and hence to reuse.

The spring arrangement is pretensioned by the locking mechanism. For the triggering, it can, for example, be provided that even a relatively low pressure on a locking element of the locking mechanism, for example the aforementioned locking pawl causes the locking mechanism to be released and loosen the spring arrangement. This ensures that the short-circuiting device closes quickly and reliably.

According to a further preferred embodiment of the invention the short-circuiting device comprises an electrically insulating jacket encasing the fixed and the movable contact piece. In the event of a short circuit or an arc occurring between the contact pieces, the insulating housing can greatly increase safety. For example, the insulating housing can prevent the arc from spreading.

The movable contact piece preferably tapers conically in the direction of the fixed contact piece and, when the short-circuit position is reached, enters a section of the fixed contact piece which has a complementary shape. This results in reliable electrical short-circuiting.

With a view to reuse after a short circuit, the short-circuiting device preferably comprises a retraction rod in order to transfer the movable contact piece from the short-circuit position into the basic position and to (re)supply the energy store with energy. Pulling on the retraction rod can transfer the movable contact piece into its basic position. At the same time, the energy store is provided with energy again. In the event of the use of a spring arrangement as an energy supplier, the at least one spring is deflected from its rest position by pulling on the retraction rod and, for example, moved to its pretensioned state.

In the converter according to the invention, it is provided that the converter has at least one short-circuiting device as named above. In particular, the converter is a multilevel converter. In respect of the advantages of such a converter, reference is made to the above-described short-circuiting device.

In the method according to the invention for short-circuiting a fixed contact piece with a movable contact piece with which a drive triggered by means of a trigger device transfers the movable contact piece from a basic position in which the contact pieces are distanced from one another into a short-circuit position in which the contact pieces are electrically conductively connected to one another, it is provided that the short-circuiting device is triggered via an electrically driven actuator of the trigger device.

As a rule, the method provides the energization of the electrically driven actuator in order to trigger the short-circuiting device. The energization of the actuator causes a movable part of the actuator to execute a movement that triggers the drive. This causes the movable contact piece to be transferred from the basic position into the short-circuit position. The electrically driven actuator is particularly fast and has little susceptibility to stray magnetic fields. The short-circuiting device can be triggered particularly quickly and reliably with this method.

All the embodiments described in connection with the short-circuiting device are correspondingly also to be understood in connection with the short-circuiting method of the contact pieces.

BRIEF DESCRIPTION OF THE DRAWING

In the following, exemplary embodiments of the invention are shown schematically in drawings and then described in more detail. The drawing shows.

DETAILED DESCRIPTION OF PREFERRED EMBODIMENTS

Figure 1:
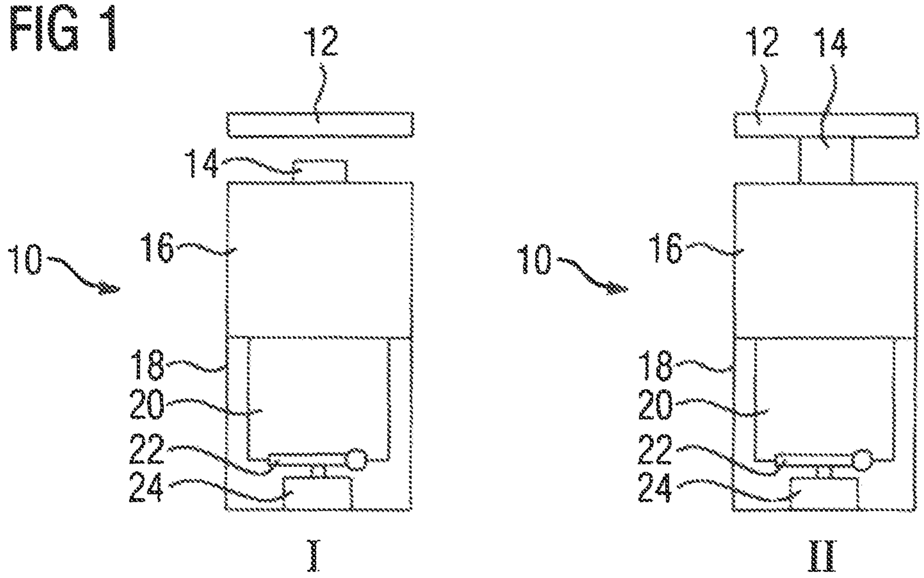
FIG. 1 a schematic view of an electrical short-circuiting device according to a preferred embodiment of the invention, FIG. 2 a sectional view through the electrical short-circuiting device according to a specific preferred embodiment and FIG. 3 a sectional view through the actuator of the electrical short-circuiting device according to the specific preferred embodiment of the invention.

FIG. 1 is a schematic view of an electrical short-circuiting device 10 according to a preferred embodiment of the invention. The short-circuiting device 10 is a short-circuit switch having a fixed contact piece 12 and a movable contact piece 14. In a basic position (position I shown on the left), the two contact pieces 12,14 are distanced from one another. Furthermore, the short-circuiting device 10 has a drive 16 for transferring, more precisely for moving, the movable contact piece 14 from its basic position into a short-circuit position (position II shown on the right) in which the movable contact piece 14 is electrically conductively connected to the fixed contact piece 12. In order to trigger the drive 16, the short-circuiting device 10 has an electrically triggerable trigger device 18, The trigger device 18 in turn comprises a locking mechanism 20 with a locking pawl 22 and an electrically driven actuator 24.

Figure 2:
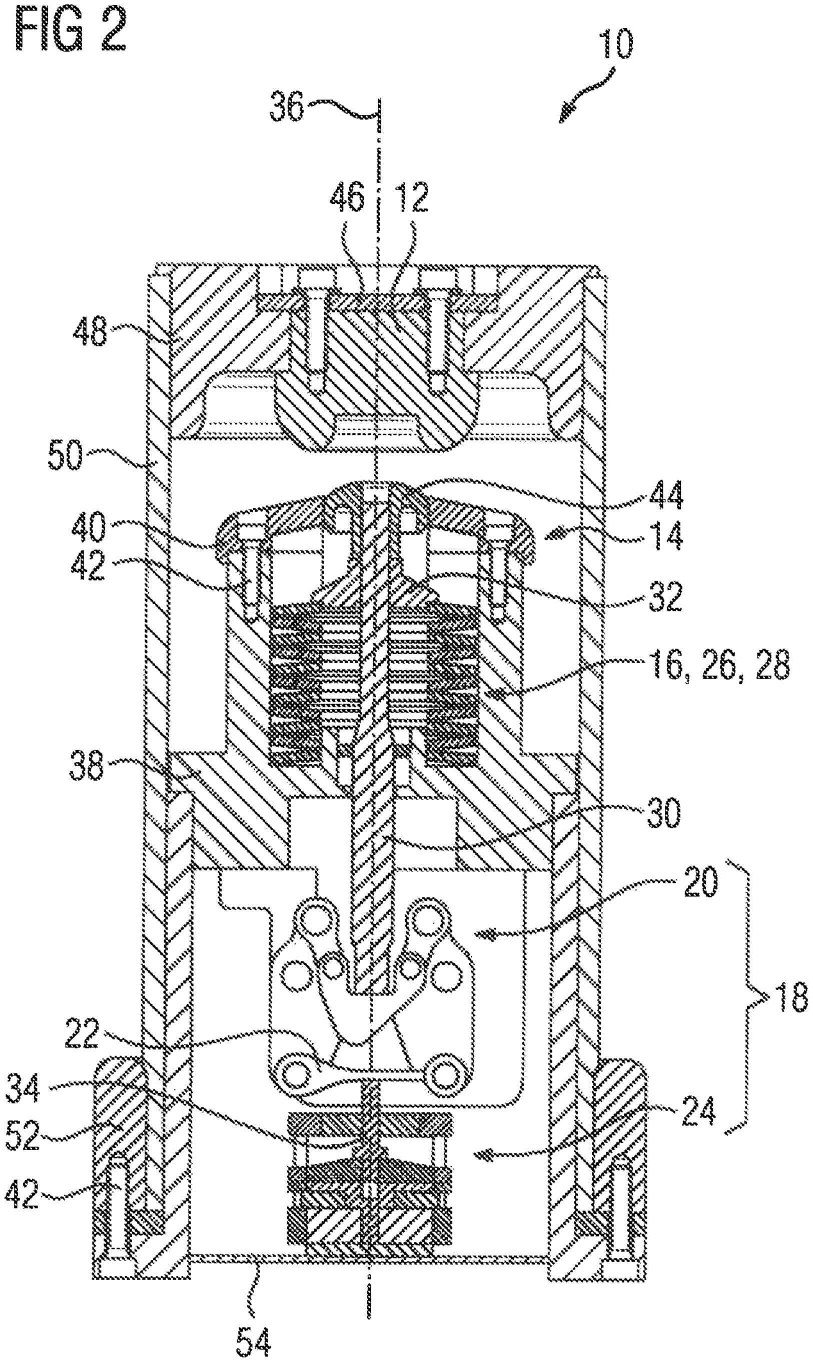

The processes on the closure of the electrical short-circuiting device 10 are as follows: the electrically driven actuator 24 actuates the locking pawl 22 of the locking mechanism 20 which triggers the drive 16. The drive 16 transfers the movable contact piece 14 from its basic position (position I) into the short-circuit position (position II) in which the movable contact piece 14 is electrically conductively connected to the fixed contact piece 12, FIG. 2 is a sectional view through the electrical short-circuiting device 10 according to a specific embodiment. Here, it may in particular be identified that the drive 16 has a mechanical energy store 26 for its energy supply, which in the example shown is embodied as a spring arrangement 28, more precisely as a disk spring stack. The corresponding disk springs are each stacked one on top of the other in alternating directions. The stack formed in this way can also be designated a series connection of disk springs. The movable contact piece 14 is in the basic position (position I from FIG. 1), i.e, the disk springs are in a pretensioned state. The movable contact piece 14 is connected to a retraction rod 30. The retraction rod 30 runs through the center of the spring arrangement 28 and is operatively connected to the locking mechanism 20. The pretensioning of the spring arrangement 28 is attached to the locking mechanism 20 which holds the pretensioning in the basic position via the retraction rod 30. For this purpose, the retraction rod 30 is connected to an intermediate element 32 which is supported on one side of the spring arrangement 28 and holds it in the pretensioned state, i.e. compresses it. When the short-circuiting device 10 has been triggered, the movable contact piece 14 is in the short-circuit position (corresponding to position II in FIG. 1) and the spring arrangement 28 is no longer in the pretensioned state or is in a less pretensioned state (not shown). Pulling on the retraction rod 30 can transfer the movable contact piece 14 from the short-circuit position back into the basic position (shown in FIG. 2) and bring the spring arrangement 28 into the pretensioned state.

The electrically driven actuator 24 has a plunger 34 which acts on the locking mechanism 20 when the short-circuiting device 10 is triggered. Herein, the plunger 34 acts on the locking pawl 22 of the locking mechanism 20. In the pretensioned state of the spring arrangement 28, the locking pawl 22 prevents the spring arrangement 28 from leaving its pretensioned state, Only pressure from the plunger 34 on the locking pawl 22 causes the locking mechanism 20 to be released and loosen the spring arrangement 28. The actuator 24, the locking mechanism 20, the retraction rod 30, the spring arrangement 28, the movable contact piece 14 and the fixed contact piece 12 are all located on an axis, namely an axis of motion 36 of the plunger 34 of the actuator 24, which also coincides with the axis of motion of the movable contact piece 14 and the retraction rod 30.

The spring arrangement 28 is surrounded by a housing 38 in which the trigger device 18 is likewise integrated. At the upper end of the housing 38, there is a contacting element 40 which is fastened on the housing 38 by means of screws 42. The contacting element 40 has a central opening in which the movable contact piece 14 is located. In its basic position, the movable contact piece 14 closes in a form-fitting manner with the contacting element 40. The movable contact piece 14 tapers conically in the direction of the fixed contact piece 12 so that when the short-circuit position is reached, it can enter a section of the fixed contact piece 12 which has a complementary shape. In addition, the movable contact piece 12 has a contact piece extension 44 that extends approximately to the intermediate element 32 of the retraction rod 30. In the short-circuit position, this contact piece extension 44 connects the movable contact piece 14 to the contacting element 40 in a conductive manner. The fixed contact piece 12 is fastened on an end piece 48 by means of screwing equipment 46. The end piece 48 forms the upper end of the short-circuiting device 10. The end piece 48 connects the fixed contact piece 12 to an electrically insulating jacket 50. The jacket 50 forms the side end of the short-circuiting device 10. The fixed contact piece 12, the movable contact piece 14, the trigger device 18 and the drive 16 are all encased by the electrically insulating jacket 50. In the region of the trigger device, the housing 38 is surrounded in a form-fitting manner by the jacket 50. At the lower end, the housing 38 protrudes beyond the jacket 50 and extends radially outward. A ring element 52 enclosing the jacket 50 from the outside is fastened to this extension of the housing 38 with screws 42. A housing floor 54 to which the actuator 24 is fastened is integrated in the lower region of the housing 38. Although the individual components of the actuator 24 are already identifiable here in FIG. 2, they will only be discussed in connection with FIG. 3.

Figure 3:
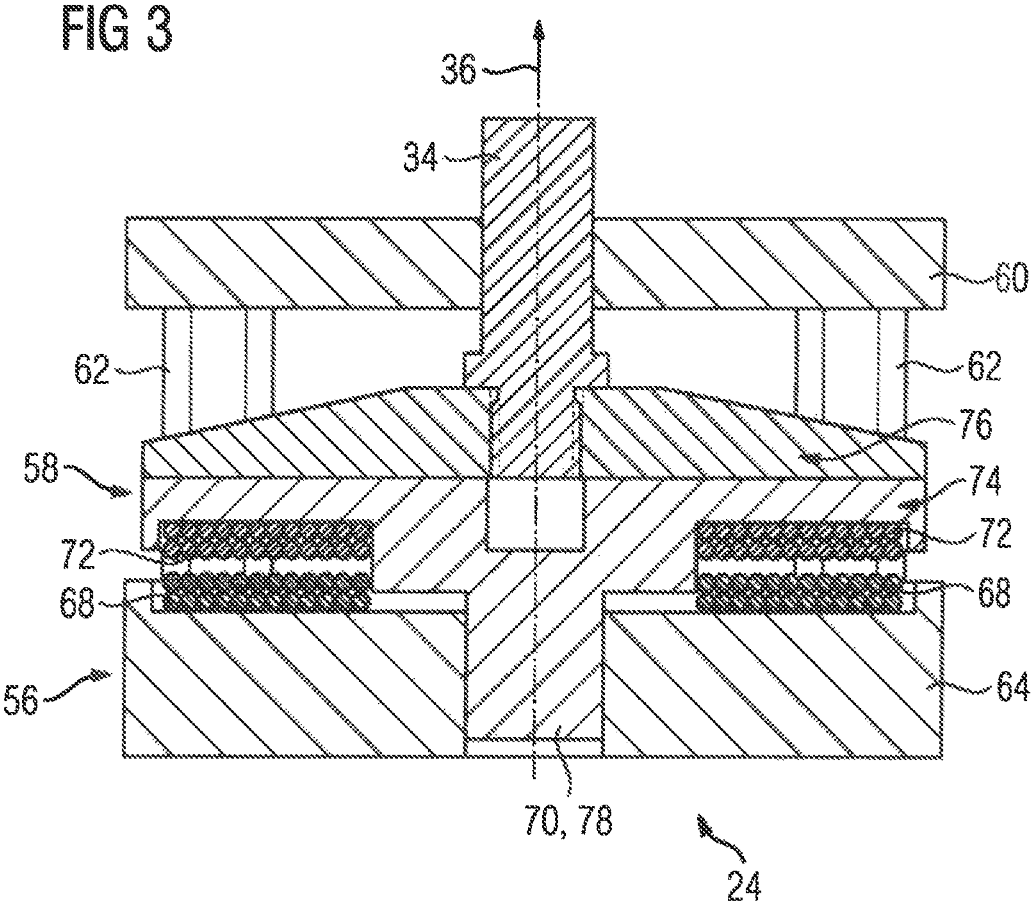

FIG. 3 is a sectional view of the actuator 24 which is part of the trigger device 18. The actuator 24 has a stator 56 and a rotor 58. The rotor 58 is connected to the plunger 34 which extends through a stop element 60. The stop element 60 is connected to the stator 56 via connection elements 62. The stator 56 includes a stator base body 64 for receiving a first coil 68. The rotor 58 likewise includes a rotor base body 70 and a second coil 72. The rotor base body 70 has two regions 74, 76. The first region 74 is used to receive the second coil 72 and the second region 76 to stiffen the first region 74. The coils 68, 72 are embodied as flat coils, with two coil packs lying one on top of the other in each case. On the side of the rotor 58 opposite the plunger 34, the rotor has a rotor extension 78 with which it engages in a recess of the stator 56, The rotor 58 is guided in its movement via the plunger 34 and also via the rotor extension 78.

On the actuation of the short-circuiting device 10, the following function results:

At least in respect of their interaction with one another, the two coils 68, 72 should be regarded as air-core coils. Therefore, the action of the actuator 24 is solely based on the Lorentz force which is generated alternately by the interaction between the coil magnetic field of one coil 68, 72 and the current in the other coil 68, 72 and vice versa.

To move the plunger 34, the coils 68, 72 are energized simultaneously such that they are mutually repellent. Since the stator 56 with the first coil 68 is fixed with respect to the actuator 24, the rotor 58 is moved with the second coil 72 along the axis of motion 36 in the direction of the stop element 60 (at the top of the figure). Together with the rotor 58, the plunger 34 serving as an actuating element also moves in this direction.

Figure 4:
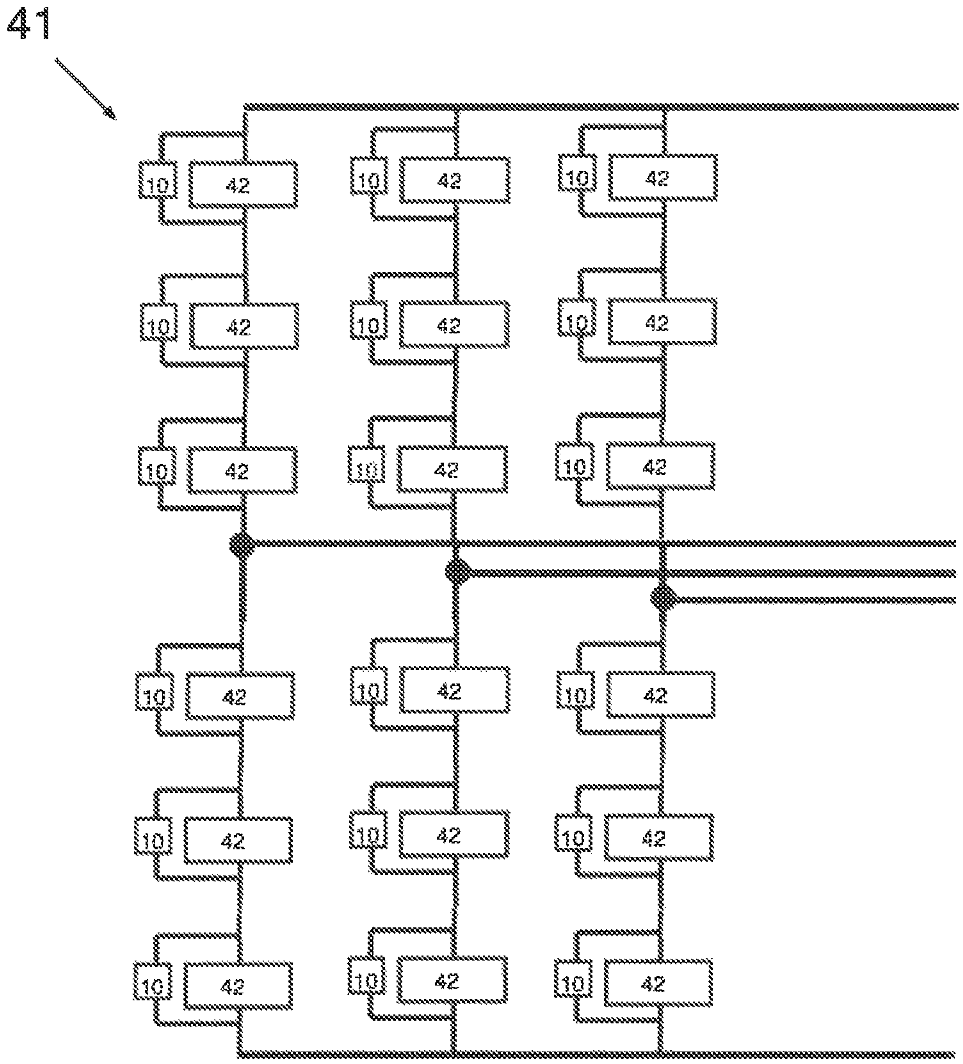
FIG. 4 a schematic view of a converter, in particular a multilevel converter, according to a specific preferred embodiment of the invention.

FIG. 4 is a schematic view of a converter, in particular a multilevel converter 41. A converter, in particular a multilevel converter 41, comprises a plurality of power modules 42 connected in series. The converter, in particular the multilevel converter 41, has at least one short-circuiting device 10, which allows short-circuiting that is as quick and safe as possible. If a power module 42 fails due to an error, it has to be bridged as quickly as possible, as otherwise the entire system can fail. The failed power module 42 is bridged by a short-circuiting device 10.

The invention claimed is:

1. An electrical short-circuiting device, comprising:

a fixed contact piece and a movable contact piece, said fixed and movable contact pieces being distanced from one another in a basic position and being electrically conductively connected to one another in a short-circuit position;

a drive configured to transfer the movable contact piece from the basic position into the short-circuit position; and a trigger device including an electrically driven actuator for triggering the drive wherein the actuator comprises a fixed stator which includes a first coil and a rotor which includes a second coil for interaction with the first coil, the rotor and second coil linearly movable along an axis of motion, with the stator and the rotor being arranged along the axis of motion, said first and second coils being configured as air-core coils capable of being actively energized so that the interaction of the first coil with the second coil causes the first coil and the second coil to repel one another, thereby moving the rotor and the second coil along the axis of motion to trigger the drive.

2. The short-circuiting device of claim 1, wherein the trigger device comprises a locking mechanism for locking the drive, said drive being triggered when the electrically driven actuator releases the locking mechanism.

3. The short-circuiting device of claim 2, wherein the actuator comprises a plunger for releasing the locking mechanism.

4. The short-circuiting device of claim 1, wherein the drive comprises a mechanical energy store for supply of energy.

5. The short-circuiting device of claim 1, further comprising an electrically insulating jacket configured to encase the fixed and movable contact pieces.

6. The short-circuiting device of claim 1, wherein the movable contact piece is configured to taper conically in a direction of the fixed contact piece and, when the short-circuit position is reached, enters a complementarily shaped section of the fixed contact piece.

7. The short-circuiting device of claim 1, further comprising a retraction rod configured to transfer the movable contact piece from the short-circuit position into the basic position while energy is supplied to the mechanical energy store at a same time.

8. A converter comprising:

a plurality of power modules; and at least one short-circuiting device rendered responsive when one of the power modules fails thereby bridging the failed power module, said at least one short-circuiting device comprising a fixed contact piece and a movable contact piece, said fixed and movable contact pieces being distanced from one another in a basic position and being electrically conductively connected to one another in a short-circuit position, a drive configured to transfer the movable contact piece from the basic position into the short-circuit position, and a trigger device including an electrically driven actuator for triggering the drive, wherein the actuator comprises a fixed stator which includes a first coil, and a rotor which includes a second coil for interaction with, the first coil, the rotor and second coil linearly movable along an axis of motion with the stator and the rotor being as air-core coils capable of being actively energized so that the interaction of the first coil with the second coil causes the first coil and the second coil to repel motion to trigger the drive.

9. The converter of claim 8, wherein the trigger device comprises a locking mechanism for locking the drive, said drive being triggered when the electrically driven actuator releases the locking mechanism.

10. The converter of claim 9, wherein the actuator comprises a plunger for releasing the locking mechanism.

11. The converter of claim 8, wherein the drive comprises a mechanical energy store for supply of energy.

12. The converter of claim 8, wherein the at least one short-circuiting device comprises an electrically insulating jacket configured to encase the fixed and movable contact pieces.

13. The converter of claim 8, wherein the movable contact piece is configured to taper conically in a direction of the fixed contact piece and, when the short-circuit position is reached, enters a complementarily shaped section of the fixed contact piece.

14. The converter of claim 8, wherein the at least one short-circuiting device comprises a retraction rod configured to transfer the movable contact piece from the short-circuit position into the basic position while energy is supplied to the mechanical energy store at a same time.

15. A method for short-circuiting a fixed contact piece with a movable contact piece, said method comprising:

activating a short-circuiting device by an electrically driven actuator of a trigger device; and energizing a fixed stator of the actuator, the fixed stator including a first coil and energizing a rotor of the actuator, the rotor including a second coil for interaction with, the first coil, the rotor and second coil linearly movable along an axis of motion, with the stator and the rotor being arranged along the axis of motion, said first and second coils being configured as air-core coils so that the interaction of the first coil with the second coil causes the first coil and the second coil to repel one another thereby moving the rotor and the second coil aeon the axis of motion to trigger a drive of the short-circuiting device to thereby cause the movable contact piece to move from a basic position in which the fixed and movable contact pieces are distanced from one another into a short-circuit position in which the fixed and movable contact pieces are electrically conductively connected to one another.

16. The method of claim 15, further comprising energizing the first coil and the second coil simultaneously.

17. A multilevel converter comprising:

a plurality of power modules connected in series; and at least one short-circuiting device rendered responsive when one of the power modules fails thereby bridging the failed power module, said at least one short-circuiting device comprising a fixed contact piece and a movable contact piece, said fixed and movable contact pieces being distanced from one another in a basic position and being electrically conductively connected to one another in a short-circuit position, a drive configured to transfer the movable contact piece from the basic position into the short-circuit position, and a trigger device including an electrically driven actuator for triggering the drive, wherein the actuator comprises a fixed stator which includes a first coil, and a rotor which includes a second coil for interaction with the first coil, the rotor and second coil linearly movable along an axis of motion, with the stator and the rotor being arranged along the axis of motion, said first and second cons being configured as air-core cons capable of being actively energized so that the interaction of the first coil with the second coil causes the first coil and the second coil to repel one another, thereby moving the rotor and the second coil along the axis of motion to trigger the drive.

* * * * *